United States Patent
Kubo et al.

(10) Patent No.: US 10,550,792 B2
(45) Date of Patent: Feb. 4, 2020

(54) FUEL INJECTION CONTROL DEVICE FOR INTERNAL COMBUSTION ENGINE AND CONTROL METHOD OF INTERNAL COMBUSTION ENGINE

(71) Applicant: TOYOTA JIDOSHA KABUSHIKI KAISHA, Toyota-shi (JP)

(72) Inventors: Masaya Kubo, Toyota (JP); Kazuya Ohshima, Toyota (JP); Yoshikazu Yamamoto, Aichi-gun (JP); Yuichiroh Yamanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/164,991

(22) Filed: Oct. 19, 2018

(65) Prior Publication Data
US 2019/0178195 A1   Jun. 13, 2019

(30) Foreign Application Priority Data
Dec. 11, 2017 (JP) .................................. 2017-236970

(51) Int. Cl.
*F02D 41/30* (2006.01)
*F02D 41/26* (2006.01)
(52) U.S. Cl.
CPC ....... *F02D 41/3094* (2013.01); *F02D 41/263* (2013.01); *F02D 2200/0614* (2013.01)

(58) Field of Classification Search
CPC .. F02D 41/3094; F02D 41/263; F02D 41/047; F02D 41/40; F02D 2200/0614
USPC ........ 123/299, 300, 431, 575, 480; 701/102, 701/103, 104, 105
See application file for complete search history.

(56) References Cited

U.S. PATENT DOCUMENTS

2006/0207560 A1   9/2006   Kobayashi
2007/0215112 A1   9/2007   Brehob et al.

FOREIGN PATENT DOCUMENTS

| EP | 1 555 418 A1 | 7/2005 |
| JP | 2006-063947 | 3/2006 |
| WO | WO 2016/084187 A1 | 6/2016 |
| WO | WO 2016/193902 A2 | 12/2016 |

*Primary Examiner* — Hai H Huynh
(74) *Attorney, Agent, or Firm* — Oblon, McClelland, Maier & Neustadt, L.L.P.

(57) ABSTRACT

A fuel injection control device for an engine includes an ECU. The ECU is configured to: change a port injection ratio in accordance with an operation state of the engine; execute correction of the total fuel injection amount by reflecting a correction amount in a basic fuel injection amount depending on the operation state when the port injection ratio is changed; and when the ECU changes the port injection ratio and calculates a second correction amount that is the correction amount having one of the positive and negative values during the execution of the correction based on a first correction amount that is the correction amount having the other one of the positive and negative values, limit reflection of the first correction amount in the basic injection amount.

4 Claims, 8 Drawing Sheets

PORT INJECTION RATIO FROM 100% TO 0%

PORT INJECTION RATIO FROM 0% TO 100%

FUEL INJECTION CONTROL DEVICE FOR INTERNAL COMBUSTION ENGINE AND CONTROL METHOD OF INTERNAL COMBUSTION ENGINE

INCORPORATION BY REFERENCE

The disclosure of Japanese Patent Application No. 2017-236970 filed on Dec. 11, 2017 including the specification, drawings and abstract is incorporated herein by reference in its entirety.

BACKGROUND

1. Technical Field

The disclosure relates to a fuel injection control device for an internal combustion engine and a control method thereof.

2. Description of Related Art

Japanese Unexamined Patent Application Publication No. 2006-063947 (JP 2006-063947 A) discloses a fuel injection control device for an internal combustion engine that changes a port injection ratio in accordance with the operation state of an internal combustion engine. The port injection ratio is the ratio of the amount of fuel injection from a port injection valve to the total amount of fuel injection from an in-cylinder injection valve and the port injection valve.

SUMMARY

In the event of a change in port injection ratio, the total fuel injection amount may be corrected by a correction amount being reflected in a basic fuel injection amount depending on the operation state of the internal combustion engine. The correction amount may be calculated as a positive value in a case where the port injection ratio is changed to increase and as a negative value in a case where the port injection ratio is changed to decrease.

When a negative-value correction amount is calculated with the port injection ratio changed during the execution of the correction based on a positive-value correction amount, for example, the positive-value correction amount and negative-value correction amount may be offset and it may be impossible to appropriately correct the total fuel injection amount. The same applies to a case where a positive-value correction amount is calculated with the port injection ratio changed during the execution of the correction based on a negative-value correction amount.

The disclosure provides a fuel injection control device for an internal combustion engine and a control method thereof that are capable of appropriately correcting a fuel injection amount.

A first aspect of the disclosure relates to a fuel injection control device for an internal combustion engine provided with an in-cylinder injection valve and a port injection valve. The fuel injection control device includes an electronic control unit. The electronic control unit is configured to change a port injection ratio in accordance with an operation state of the internal combustion engine. The port injection ratio is a ratio of the amount of fuel injection from the port injection valve to the total amount of fuel injection from the in-cylinder injection valve and the port injection valve. The electronic control unit is configured to execute correction of the total fuel injection amount by reflecting a correction amount in a basic fuel injection amount depending on the operation state of the internal combustion engine when the port injection ratio is changed. The electronic control unit is configured to calculate the correction amount as a positive value when the port injection ratio is changed to increase. The electronic control unit is configured to calculate the correction amount as a negative value when the port injection ratio is changed to decrease. The electronic control unit is configured to, when the electronic control unit changes the port injection ratio and calculates a second correction amount that is the correction amount having one of the positive and negative values during the execution of the correction based on a first correction amount that is the correction amount having the other one of the positive and negative values, limit reflection of the first correction amount in the basic injection amount. With this configuration, offsetting of the positive- and negative-value correction amounts can be prevented and the fuel injection amount can be appropriately corrected.

In the fuel injection control device according to the aspect of the disclosure, the electronic control unit may be configured to set a lower limit value to zero with respect to the first correction amount when the second correction amount is a positive value. The electronic control unit may be configured to set an upper limit value to zero with respect to the first correction amount when the second correction amount is a negative value.

In the fuel injection control device according to the aspect of the disclosure, the electronic control unit may be configured to perform the calculation such that the correction amount gradually converges to zero.

A second aspect of the disclosure relates to a control method of an internal combustion engine provided with an in-cylinder injection valve and a port injection valve. The control method includes: changing, by an electronic control unit, a port injection ratio in accordance with an operation state of the internal combustion engine, the port injection ratio being a ratio of an amount of fuel injection from the port injection valve to a total amount of fuel injection from the in-cylinder injection valve and the port injection valve; executing, by the electronic control unit, correction of the total fuel injection amount by reflecting a correction amount in a basic fuel injection amount depending on the operation state of the internal combustion engine when the port injection ratio is changed; calculating, by the electronic control unit, the correction amount as a positive value when the port injection ratio is changed to increase; calculating, by the electronic control unit, the correction amount as a negative value when the port injection ratio is changed to decrease; and when the electronic control unit changes the port injection ratio and calculates a second correction amount that is the correction amount having one of the positive and negative values during the execution of the correction based on a first correction amount that is the correction amount having the other one of the positive and negative values, limiting, by the electronic control unit, reflection of the first correction amount in the basic injection amount.

According to the aspects of the disclosure, a fuel injection control device for an internal combustion engine that is capable of appropriately correcting a fuel injection amount can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
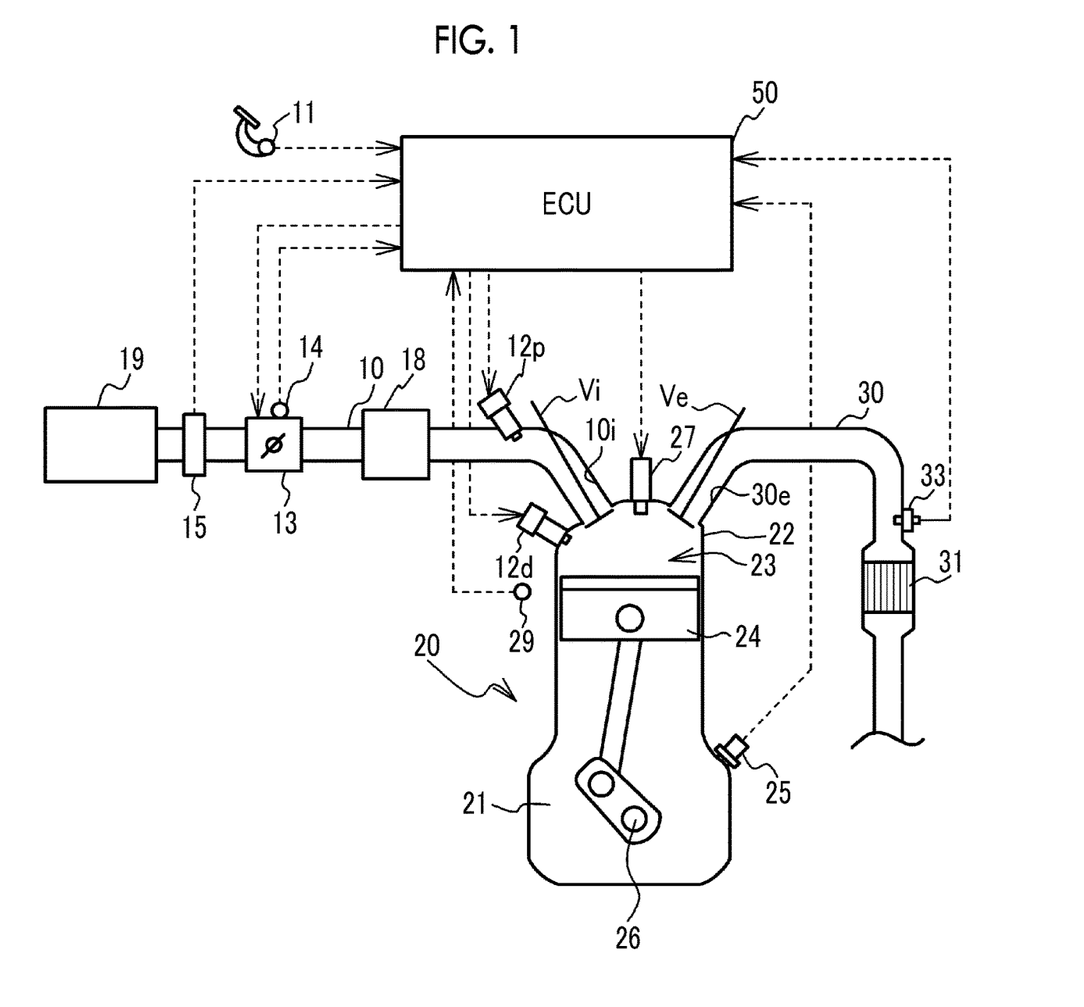
FIG. 1 is a diagram illustrating an internal combustion engine to which a fuel injection control device according to the present example is applied.

FIG. 1 is a diagram illustrating an internal combustion engine to which a fuel injection control device according to the present example is applied. An engine 20 is an example of an internal combustion engine, and a piston 24 reciprocates as an air-fuel mixture is combusted in a combustion chamber 23 inside a cylinder head 22 installed in the upper portion of a cylinder block 21 storing the piston 24. The reciprocation of the piston 24 is converted into the rotational motion of a crankshaft 26. The engine 20 is an in-line four-cylinder engine that has four cylinders (not illustrated). However, the engine 20 is not limited thereto.

An intake valve Vi opening and closing an intake port 10i and an exhaust valve Ve opening and closing an exhaust port 30e are disposed for each cylinder in the cylinder head 22 of the engine 20. An ignition plug 27 for igniting the air-fuel mixture in the combustion chamber 23 is attached for each cylinder to the top portion of the cylinder head 22.

The intake port 10i of each cylinder is connected to a surge tank 18 via a branch pipe for each cylinder. An intake pipe 10 is connected to the upstream side of the surge tank 18. An air cleaner 19 is disposed at the upstream end of the intake pipe 10. On the intake pipe 10, an air flow meter 15 for intake air amount detection and an electronically controlled throttle valve 13 are disposed in this order from the upstream side of the intake pipe 10.

A port injection valve 12p for fuel injection into the intake port 10i is installed at the intake port 10i of each cylinder. An in-cylinder injection valve 12d for in-cylinder fuel injection is set for each cylinder. The fuel that is injected from the port injection valve 12p and the in-cylinder injection valve 12d forms the air-fuel mixture by being mixed with intake air. The air-fuel mixture is suctioned into the combustion chamber 23 when the intake valve Vi is opened. Then, the air-fuel mixture is compressed by the piston 24, ignited by the ignition plug 27, and combusted.

The exhaust port 30e of each cylinder is connected to an exhaust pipe 30 via a branch pipe for each cylinder. A three-way catalyst 31 is disposed on the exhaust pipe 30. An air-fuel ratio sensor 33 for detecting the air-fuel ratio of exhaust gas is installed on the upstream side of the three-way catalyst 31.

An ECU 50 is provided with a central processing unit (CPU), a random access memory (RAM), and a read-only memory (ROM). The ECU 50 controls the engine 20 by executing a program stored in the RAM and the ROM. The ECU 50 is a fuel injection control device for the engine 20 and executes the control to be described later. The control is functionally realized by the CPU, the ROM, and the RAM. Details thereof will be described later.

The ignition plug 27, the throttle valve 13, the port injection valve 12p, the in-cylinder injection valve 12d, and so on are electrically connected to the ECU 50. In addition, an accelerator operation amount sensor 11 for accelerator operation amount detection, a throttle opening degree sensor 14 detecting the throttle opening degree of the throttle valve 13, the air flow meter 15 for intake air amount detection, the air-fuel ratio sensor 33, a crank angle sensor 25 detecting the crank angle of the crankshaft 26, a coolant temperature sensor 29 detecting the temperature of a coolant for the engine 20, and various other sensors are electrically connected to the ECU 50. The ECU 50 performs ignition timing control, fuel injection amount control, port injection ratio control, fuel injection timing control, throttle opening degree control, and so on and controls the ignition plug 27, the throttle valve 13, the port injection valve 12p, the in-cylinder injection valve 12d, and so on based on the values that are detected by the various sensors and the like so that a desired output is obtained.

The ECU 50 sets a target air-fuel ratio in accordance with the operation state of the engine 20. For example, a stoichiometric air-fuel ratio is set as the target air-fuel ratio when the operation state of the engine 20 is in a low-rotation and low-load region and a ratio richer than the stoichiometric air-fuel ratio is set as the target air-fuel ratio when the operation state of the engine 20 is in a high-rotation and high-load region. Once the target air-fuel ratio is set, feedback control is performed on the amount of fuel injection into each cylinder such that the air-fuel ratio that is detected by the air-fuel ratio sensor 33 corresponds to the target air-fuel ratio.

The ECU 50 is configured to change a port injection ratio in accordance with the operation state of the engine 20. The port injection ratio is the ratio of the amount of fuel injection from the port injection valve 12p to the total amount of fuel injection from the in-cylinder injection valve 12d and the port injection valve 12p. For example, although the present disclosure is not limited to the followings, fuel injection is performed solely from the port injection valve 12p in an idle operation state, from both the in-cylinder injection valve 12d and the port injection valve 12p in a low-load operation state and a medium-load operation state, and solely from the in-cylinder injection valve 12d in a high-load operation state.

The ECU 50 is configured to execute total fuel injection amount correction, by reflecting a correction amount with respect to the fuel adhesion amount at the intake port and the intake valve (hereinafter, referred to as a "correction amount") in a basic fuel amount that is determined in accordance with the operation state of the engine 20, in the event of a change in port injection ratio. The correction amount is the adhesion amount of the fuel that is assumed to adhere to the intake port 10i and the intake valve Vi. The ECU 50 is configured to calculate the correction amount as a positive value in a case where the port injection ratio is changed to increase and calculate the correction amount as a negative value in a case where the port injection ratio is changed to decrease. This will be described in detail below.

Figure 2:
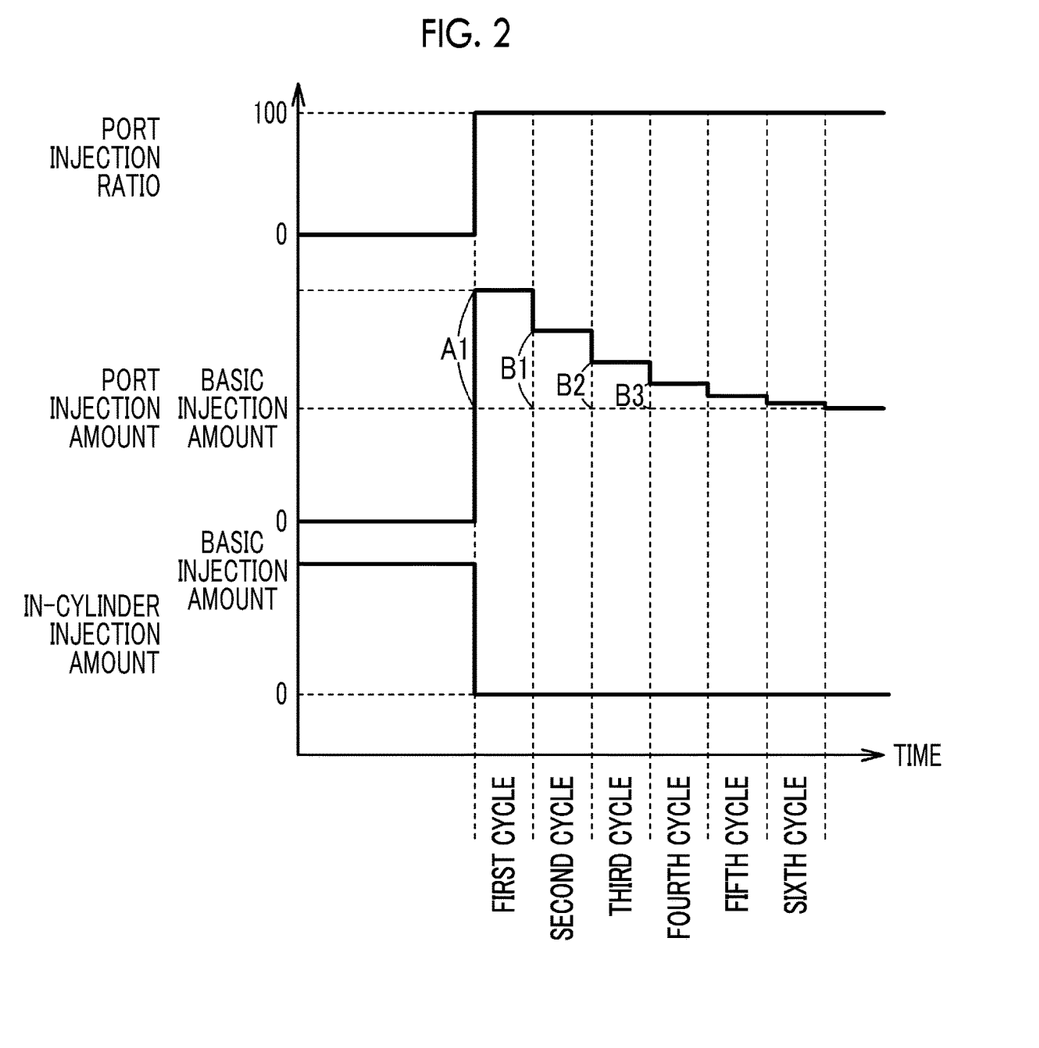
FIG. 2 is a time chart illustrating port and in-cylinder injection amounts in a case where a port injection ratio is changed from 0% to 100%.

A case where the port injection ratio is changed from 0% to 100% will be described below. FIG. 2 is a time chart illustrating port and in-cylinder injection amounts in a case where the port injection ratio is changed from 0% to 100%. Once the port injection ratio is changed as described above, correction in which the correction amount is added to the total fuel injection amount is executed. Specifically, as illustrated in FIG. 2, the in-cylinder injection amount is changed from the basic injection amount to zero and the port injection amount is changed from zero to an amount obtained by adding the correction amount to the basic injection amount. The port injection amount is corrected to increase as described above because part of the fuel adheres to the intake port 10i and the intake valve, the fuel is undersupplied into the combustion chamber 23, and a desired air-fuel ratio cannot be realized, even in the event of a port injection ratio change from 0% to 100%, when the amount of fuel that is injected from the port injection valve 12p is the basic injection amount. Accordingly, the amount obtained by adding the correction amount to the basic injection amount is determined as the port injection amount in view of the fuel adhesion amount described above.

As illustrated in FIG. 2, correction amounts A1, B1, B2, B3, . . . indicate the correction amounts at the first cycle, the second cycle, the third cycle, the fourth cycle, . . . following the port injection ratio change from 0% to 100%, respectively. The correction amounts A1, B1, B2, B3, . . . gradually decrease over a predetermined cycle and the correction amount eventually becomes zero. After the elapse of a predetermined cycle period from the port injection ratio change from 0% to 100%, the port injection amount is controlled solely to the basic injection amount. Although a case where a correction amount of zero is set at the seventh cycle from the port injection ratio change from 0% to 100% is illustrated as an example in FIG. 2 for easier understanding, the present disclosure is not limited thereto.

Figure 3:
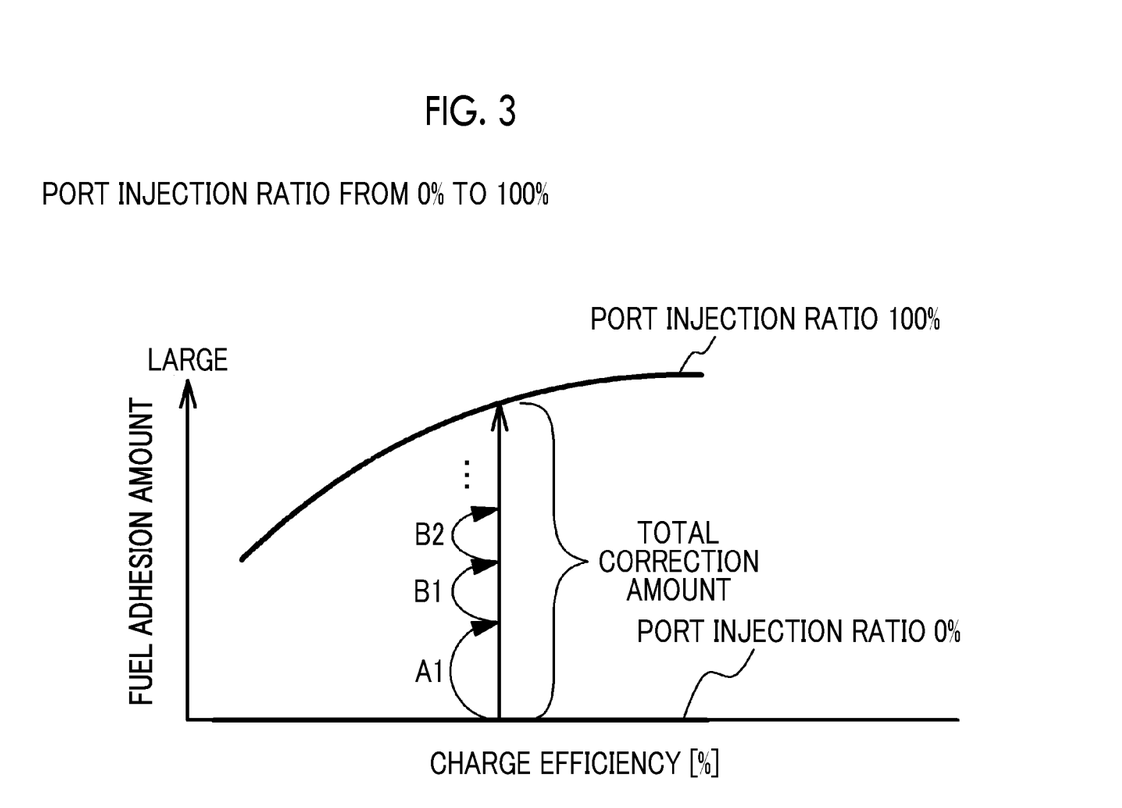
FIG. 3 is an explanatory diagram of a correction amount in a case where the port injection ratio is changed from 0% to 100%.

FIG. 3 is an explanatory diagram of the correction amount in a case where the port injection ratio is changed from 0% to 100%. In FIG. 3, the vertical axis represents the fuel adhesion amount at the intake port 10i and the intake valve Vi and the horizontal axis represents intake charge efficiency. At a port injection ratio of 0%, no fuel is injected from the port injection valve 12p, and thus the fuel adhesion amount is zero. At a port injection ratio of 100%, the fuel adhesion amount increases as the intake charge efficiency increases. The fuel adhesion amount at a port injection ratio of 100% is stored in the ROM of the ECU 50 after being experimentally calculated. The fuel adhesion amount corresponds to the total correction amount.

The correction amount A1 is the correction amount at the first cycle following the change in port injection ratio and is a correction amount depending on the amount of change in port injection ratio resulting from the change in port injection ratio. In the event of a port injection ratio change from 0% to 100%, fuel injection is initiated from the zero fuel injection from the port injection valve 12p up to that moment, and thus the fuel adhesion amount is relatively large.

The correction amounts B1, B2, B3, . . . are the correction amounts at the second and subsequent cycles following the change in port injection ratio, respectively. Each of the correction amounts B1, B2, B3, . . . is a correction amount depending on the amount of change in the temperature of the intake valve Vi that is caused by the fuel adhering to the intake valve Vi. Although the fuel adhering to the intake valve Vi evaporates more when the temperature of the intake valve Vi is higher, the temperature of the intake valve Vi falls as the fuel adhesion amount increases, and thus the amount by which the fuel adhering to the intake valve Vi evaporates during one cycle period decreases as the fuel adhesion amount at the intake valve Vi increases. Accordingly, the correction amounts B1, B2, B3, . . . are calculated to gradually converge to zero.

The ECU 50 calculates the correction amount at each cycle as follows. The total correction amount is calculated based on the intake charge efficiency estimated from the throttle opening degree and so on and the fuel adhesion amount in a case where the port injection ratio stored in the ROM is 100%. The correction amount A1 is calculated by the total correction amount being multiplied by a predetermined correction coefficient k1 depending on the amount of change in port injection ratio. The correction coefficient k1 is a value greater than 0 and less than 1 and is stored in the ROM in advance. In calculating the correction amount B1, the value that is obtained by subtraction of the correction coefficient k1 from 1 is multiplied by the total correction amount and multiplied by a predetermined correction coefficient k2 depending on the amount of change in the temperature of the intake valve Vi. The correction coefficient k2 also is a value greater than 0 and less than 1 and is stored in the ROM in advance. In calculating the correction amount B2, the value that is obtained by subtraction of the correction coefficient k2 from 1 is multiplied by the previous correction amount B1. Likewise, in calculating the correction amount B3, the value that is obtained by subtraction of the correction coefficient k2 from 1 is multiplied by the previous correction amount B2. The subsequent correction amounts are calculated in the same manner. Finally, the correction amount is calculated as zero and the correction is stopped in a case where the total of all of the correction amounts reaches the total correction amounts calculated in advance. The correction amount calculation method is an example and is not limited to the above.

Figure 4:
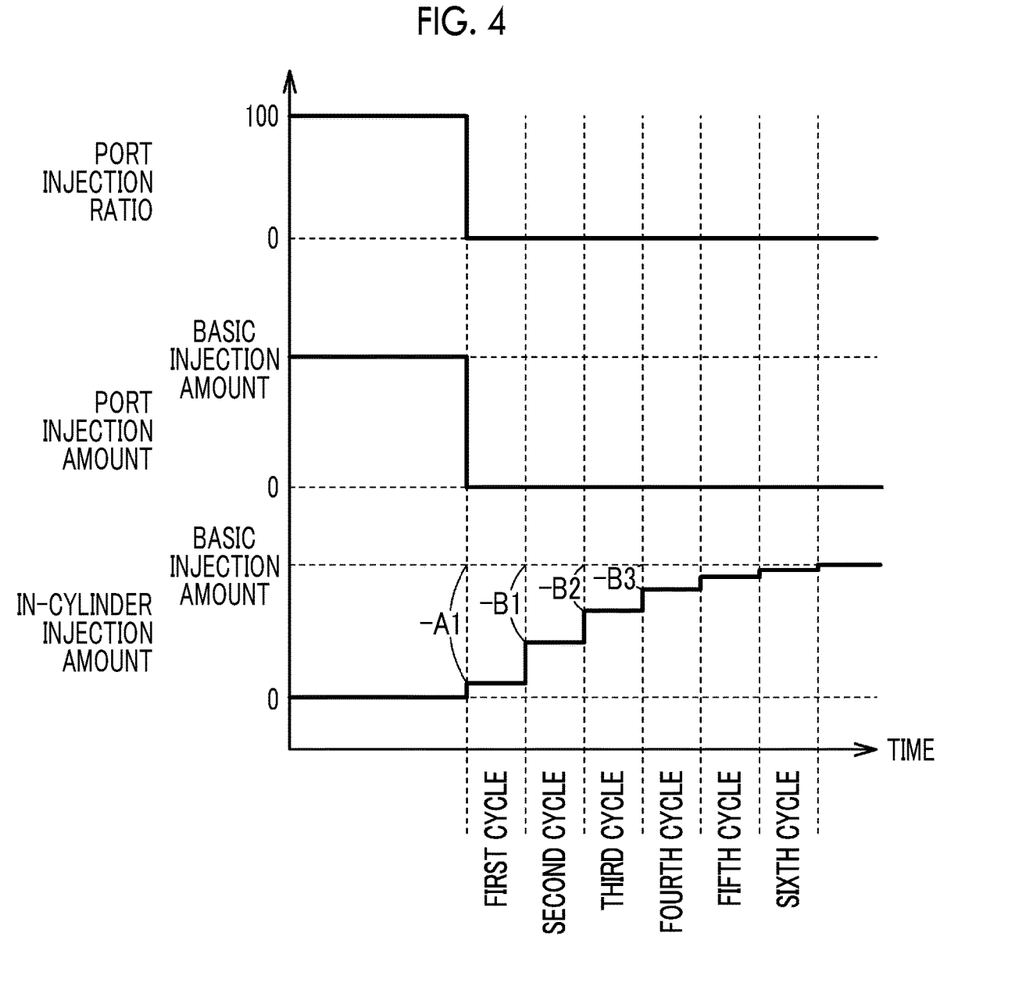
FIG. 4 is a time chart illustrating the port and in-cylinder injection amounts in a case where the port injection ratio is changed from 100% to 0%.

A case where the port injection ratio is changed from 100% to 0% will be described below. FIG. 4 is a time chart illustrating the port and in-cylinder injection amounts in a case where the port injection ratio is changed from 100% to 0%. Once the port injection ratio is changed as described above, correction in which the correction amount is reflected in the total fuel injection amount is executed. Specifically, the port injection amount is changed from the basic injection amount to zero and the in-cylinder injection amount is changed from zero to an amount obtained by reflecting the correction amount in the basic injection amount. The correction amount is calculated as a negative value and the in-cylinder injection amount is an amount reduced from the basic injection amount. The fuel injection amount is corrected to be reduced as described above because of the following reason. Even in the event of a port injection ratio change from 100% to 0%, part of the fuel adhering to the intake valve Vi and the intake port 10i as a result of port injection up to that moment is introduced into the combustion chamber 23 once the fuel is injected from the in-cylinder injection valve 12d by the basic injection amount. Accordingly, a more-than-needed amount of fuel is supplied into the combustion chamber 23 in conjunction with the in-cylinder injection amount and a desired air-fuel ratio cannot be realized. Accordingly, the in-cylinder injection amount is reduced to the same extent.

As illustrated in FIG. 4, correction amounts −A1, −B1, −B2, −B3, . . . indicate the correction amounts at the first cycle, the second cycle, the third cycle, the fourth cycle, . . . following the port injection ratio change from 100% to 0%, respectively. The correction amounts −A1, −B1, −B2, −B3, . . . gradually decrease over a predetermined cycle and the correction amount eventually becomes zero. After the elapse of a predetermined cycle period from the port injection ratio change from 100% to 0%, the in-cylinder injection amount is controlled solely to the basic injection amount.

Figure 5:
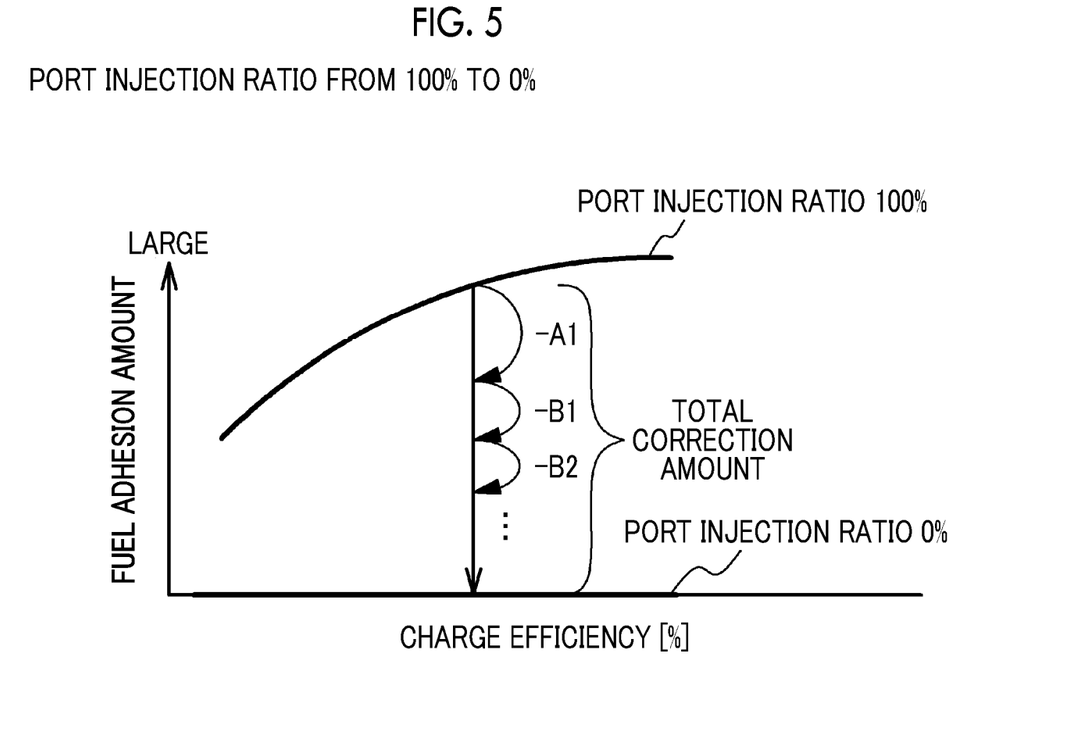
FIG. 5 is an explanatory diagram of the correction amount in a case where the port injection ratio is changed from 100% to 0%.

FIG. 5 is an explanatory diagram of the correction amount in a case where the port injection ratio is changed from 100% to 0%. The total correction amount is the total of the correction amounts −A1, −B1, −B2, . . . illustrated in FIG. 5. As is the case with the correction amount A1 described above, the correction amount −A1 is a correction amount depending on the amount of change in port injection ratio resulting from the change in port injection ratio. In the event of a port injection ratio change from 100% to 0%, fuel injection is stopped from the fuel injection from the port injection valve 12p up to that moment, and thus a decrease in fuel adhesion amount is relatively large. The correction amount −A1 is described as the amount that has the same absolute value as the correction amount A1.

As is the case with the correction amounts B1, B2, B3, . . . , each of the correction amounts −B1, −B2, −B3, . . . is a correction amount depending on the amount of change in the temperature of the intake valve Vi. The temperature of the intake valve Vi rises as the fuel adhesion amount at the intake valve Vi decreases, and the amount by which the fuel adhering to the intake valve Vi evaporates during one cycle period increases as the temperature of the intake valve Vi rises. Accordingly, the correction amounts −B1, −B2, −B3, . . . are calculated such that the absolute values thereof gradually decrease and calculated such that the amount of reduction gradually converges to zero. The correction amounts −B1, −B2, −B3, . . . are described as the amounts that have the same absolute values as the correction amounts B1, B2, B3, . . . , respectively.

The correction amounts −A1, −B1, −B2, −B3, . . . are calculated by a method similar to the above-described method for calculating the correction amounts A1, B1, B2, B3. Specifically, the method for calculating the correction amounts −A1, −B1, −B2, −B3, . . . is the same as the method for calculating the correction amounts A1, B1, B2, B3 except that the total correction amount is used as a negative value in the former method. Also in this case, the correction amount calculation method is an example and is not limited to the above.

In the present specification, the above-described correction amounts A1, −A1 are collectively referred to as a correction amount A depending on the amount of change in port injection ratio. The correction amounts B1, B2, . . . and −B1, −B2, . . . are collectively referred to as a correction amount B depending on the amount of change in the temperature of the intake valve Vi.

Figure 6A:
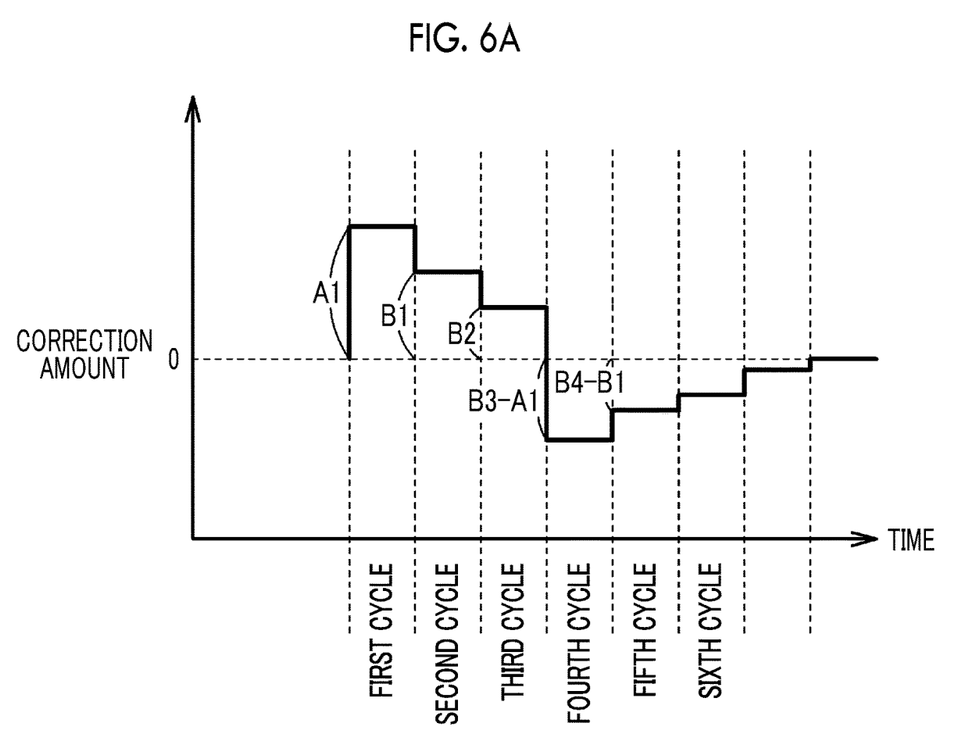
FIG. 6A is a timing chart illustrating a change in correction amount in a case where the port injection ratio is changed from 100% to 0% while fuel injection amount correction is executed with the port injection ratio changed from 0% to 100%.
Figure 6B:
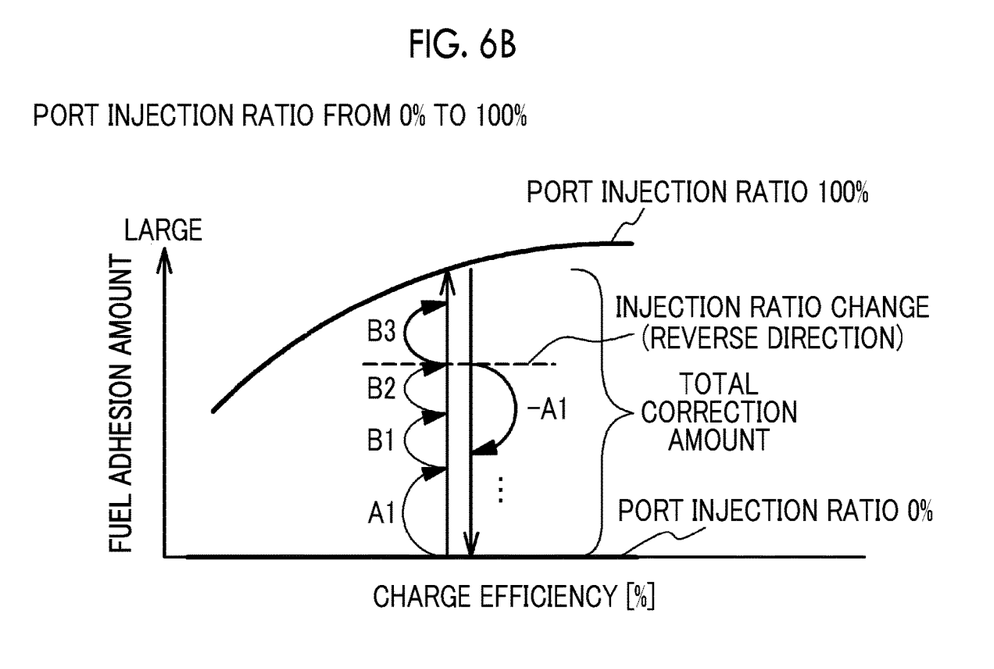
FIG. 6B is an explanatory diagram of the correction amount in a case where the port injection ratio is changed from 100% to 0% while fuel injection amount correction is executed with the port injection ratio changed from 0% to 100%.

Described below is a problem that may arise in the event of a change in port injection ratio during fuel injection amount correction execution. FIG. 6A is a timing chart illustrating a change in correction amount in a case where the port injection ratio is changed from 100% to 0% while fuel injection amount correction is executed with the port injection ratio changed from 0% to 100%. FIG. 6B is an explanatory diagram of the correction amount in a case where the port injection ratio is changed from 100% to 0% while fuel injection amount correction is executed with the port injection ratio changed from 0% to 100%. In a case where the port injection ratio is changed from 100% to 0% at the fourth cycle after a change from 0% to 100%, for example, the correction amount at the fourth cycle may be calculated as a value obtained by adding the correction amount −A1 to the correction amount B3 as illustrated in FIG. 6A. The correction amount at the fifth cycle may be calculated as a value obtained by adding the correction amount −B1 to the correction amount B4. The correction amount of the fuel injection amount in a case where the port injection ratio is changed from 0% to 100% and the correction amount of the fuel injection amount in a case where the port injection ratio is changed from 100% to 0% are offset as described above, and the correction amount after a port injection ratio change from 100% to 0% is insufficient compared to the original correction amount. This problem may arise also in a case where the port injection ratio is changed from 0% to 100% while fuel injection amount correction is executed with the port injection ratio changed from 100% to 0%. Accordingly, in the present example, the ECU 50 executes the following control.

Figure 7:
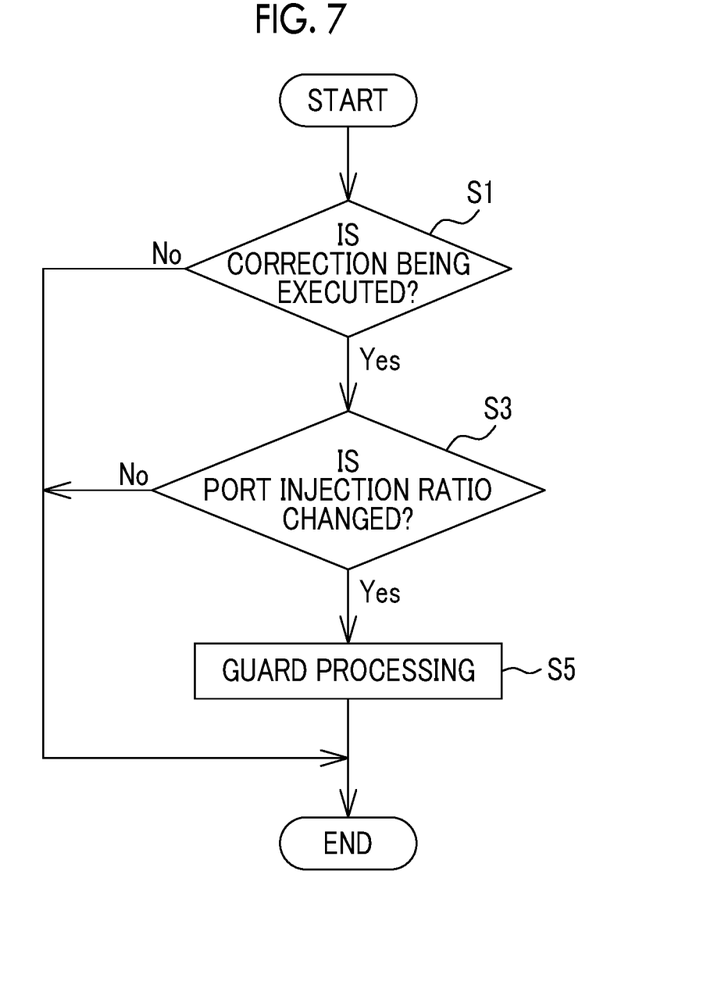
FIG. 7 is a flowchart illustrating an example of control executed by an electronic control unit (ECU)

FIG. 7 is a flowchart illustrating an example of the control that is executed by the ECU 50. The control is repeatedly executed at a predetermined cycle. The ECU 50 determines whether or not the above-described fuel injection amount correction is being executed (Step S1). The ECU 50 makes the determination based on, for example, whether or not there is a calculated correction amount. This control is terminated in the case of a negative determination in Step S1. In the case of a positive determination in Step S1, the ECU 50 determines whether or not the port injection ratio is changed (Step S3). This control is terminated in the case of a negative determination in Step S3.

In the case of a positive determination in Step S3, the ECU 50 executes guard processing (Step S5). The guard processing is to limit the value of the correction amount B described above. Specifically, in the guard processing, the lower limit value of the correction amount B is limited to zero in a case where the correction amount A is calculated as a positive value and the upper limit value of the correction amount B is limited to zero in a case where the correction amount A is calculated as a negative value. In this configuration, in a case where the correction is executed based on the correction amount that has one of positive and negative values and the correction amount that has the other one of the positive and negative values is calculated with the port injection ratio changed during the execution of the correction, reflection of the correction amount having one of positive and negative values in the basic injection amount is limited.

According to the above, in the above-described example illustrated in FIG. 6A, for example, the correction amount −A1 calculated with the port injection ratio changed from 100% to 0% is a negative value, and thus the upper limit values of the correction amounts B3, B4, . . . are limited to zero. The correction amounts −B1, −B2, −B3, . . . are negative values, and thus are not practically limited even when the upper limit values are limited to zero. The correction amounts B3, B4, . . . are not practically reflected as correction amounts with respect to the fuel injection amount, and solely the correction amounts −B1, −B2, . . . are reflected with respect to the fuel injection amount.

Figure 8:
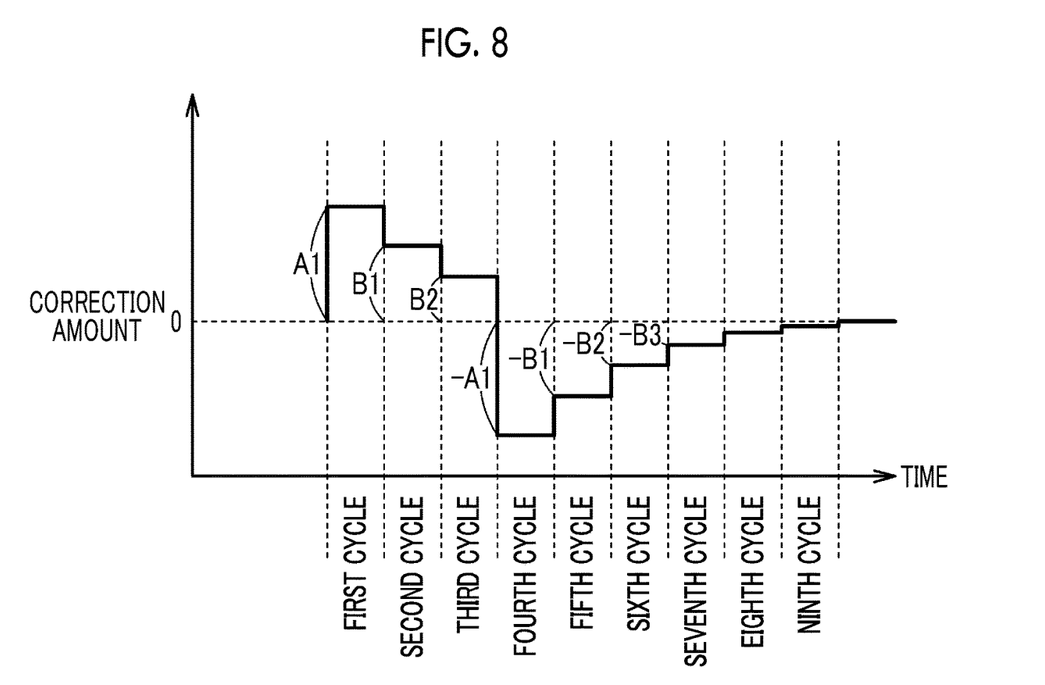
FIG. 8 is a timing chart illustrating a change in correction amount according to the present example.

FIG. 8 is a timing chart illustrating a change in correction amount according to the present example. In a case where the port injection ratio is changed from 100% to 0% while the fuel injection amount correction is executed with the port injection ratio changed from 0% to 100%, the correction amounts −A1, −B1, −B2, . . . are reflected with respect to the fuel injection amount without the correction amounts B3, B4, . . . being reflected as described above. Accordingly, the correction amount in the case of a port injection ratio change from 0% to 100% can be ensured.

In a case where the port injection ratio is changed from 0% to 100% while the fuel injection amount correction is executed with the port injection ratio changed from 100% to 0%, the correction amount A1 calculated with the port injection ratio changed from 0% to 100% is a positive value, and thus the lower limit value of the correction amount B is limited to zero. The lower limit value of the correction amount B calculated with the port injection ratio changed from 100% to 0% is limited to zero, and thus the correction amount B is not practically reflected with respect to the fuel injection amount. In a case where the port injection ratio is changed from 0% to 100% at the fourth cycle following a port injection ratio change from 100% to 0%, for example, solely the correction amounts A1, B1, B2, . . . are reflected practically without the correction amounts −B3, −B4, . . . being reflected with respect to the basic injection amount. Accordingly, also in this case, the correction amount in the case of a port injection ratio change from 100% to 0% can be ensured.

As described above, in the event of a change in port injection ratio during the execution of the correction, reflection of an unneeded correction amount in the fuel injection amount can be limited by setting of the upper limit value and the lower limit value of the correction amount B that is calculated based on whether the correction amount A calculated by the change in port injection ratio is a positive value or a negative value. By this simple method, an appropriate correction amount can be ensured even after a change in port injection ratio, the fuel injection amount can be appropriately corrected, and a desired air-fuel ratio can be realized.

Although a case where the port injection ratio is changed from 0% to 100% or from 100% to 0% has been described in the above-described example, the present disclosure is not limited thereto. For example, the above-described content can be applied also in a case where the port injection ratio is changed to decrease while fuel injection amount correction is executed with the port injection ratio changed to increase and the fuel is injected from both the in-cylinder injection valve 12d and the port injection valve 12p with the port injection ratio controlled at a constant ratio within a range from 0% to 100%. Likewise, the above-described content can be applied also in a case where the port injection ratio is changed to increase while fuel injection amount correction is executed with the port injection ratio changed to decrease and the fuel is injected from both the in-cylinder injection valve 12d and the port injection valve 12p with the port injection ratio controlled at a constant ratio within a range from 0% to 100%.

Although an example of the invention has been described in detail above, the invention is not limited to the specific example, and various modifications and changes may be made within the scope of the invention described in the claims.

What is claimed is:

1. A fuel injection control device for an internal combustion engine provided with an in-cylinder injection valve and a port injection valve, the fuel injection control device comprising an electronic control unit configured to:
  change a port injection ratio in accordance with an operation state of the internal combustion engine, the port injection ratio being a ratio of an amount of fuel injection from the port injection valve to a total amount of fuel injection from the in-cylinder injection valve and the port injection valve;
  execute correction of the total fuel injection amount by reflecting a correction amount in a basic fuel injection amount depending on the operation state of the internal combustion engine when the port injection ratio is changed;
  calculate the correction amount as a positive value when the port injection ratio is changed to increase;
  calculate the correction amount as a negative value when the port injection ratio is changed to decrease; and
  when the electronic control unit changes the port injection ratio and calculates a second correction amount that is the correction amount having one of the positive and negative values during the execution of the correction based on a first correction amount that is the correction amount having the other one of the positive and negative values, limit reflection of the first correction amount in the basic injection amount.

2. The fuel injection control device according to claim 1, wherein:
  the electronic control unit is configured to set a lower limit value to zero with respect to the first correction amount when the second correction amount is the positive value; and
  the electronic control unit is configured to set an upper limit value to zero with respect to the first correction amount when the second correction amount is the negative value.

3. The fuel injection control device according to claim 1, wherein the electronic control unit is configured to perform the calculation such that the correction amount gradually converges to zero.

4. A control method for an internal combustion engine provided with an in-cylinder injection valve and a port injection valve, the control method comprising:
  changing, by an electronic control unit, a port injection ratio in accordance with an operation state of the internal combustion engine, the port injection ratio being a ratio of an amount of fuel injection from the port injection valve to a total amount of fuel injection from the in-cylinder injection valve and the port injection valve;
  executing, by the electronic control unit, correction of the total fuel injection amount by reflecting a correction amount in a basic fuel injection amount depending on the operation state of the internal combustion engine when the port injection ratio is changed;
  calculating, by the electronic control unit, the correction amount as a positive value when the port injection ratio is changed to increase;
  calculating, by the electronic control unit, the correction amount as a negative value when the port injection ratio is changed to decrease; and
  when the electronic control unit changes the port injection ratio and calculates a second correction amount that is the correction amount having one of the positive and negative values during the execution of the correction based on a first correction amount that is the correction amount having the other one of the positive and negative values, limiting, by the electronic control unit, reflection of the first correction amount in the basic injection amount.

* * * * *